March 30, 1965  I. A. ELLMAN  3,175,731
FLUORIDE-CONTAINING DENTIFRICE DISPENSER
Filed Feb. 28, 1963
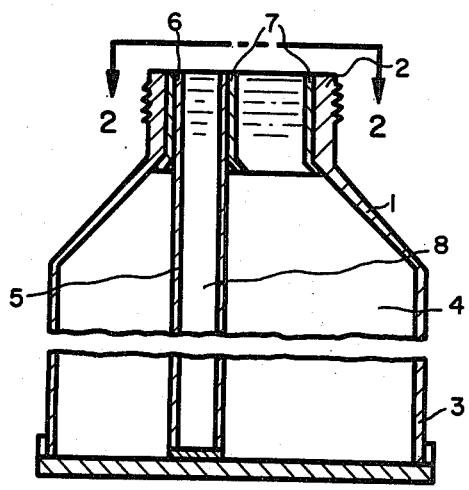
Fig. 1
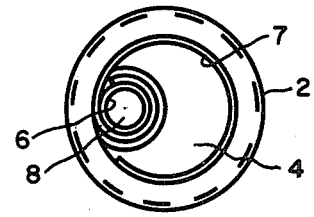
Fig. 2
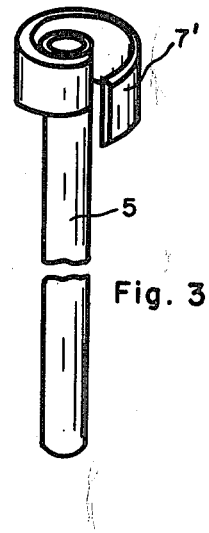
Fig. 3
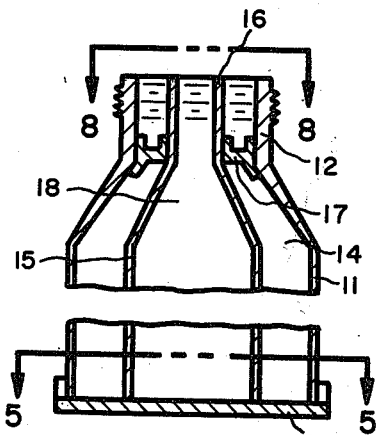
Fig. 4
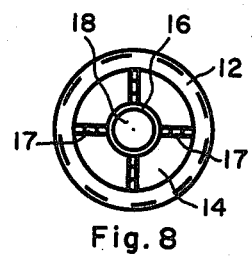
Fig. 8
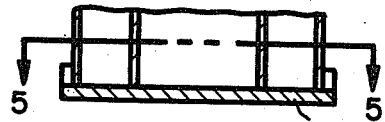
Fig. 5
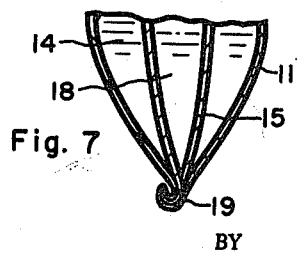
Fig. 7
Fig. 6
INVENTOR.
I. A. ELLMAN
BY
ATTORNEY

3,175,731
FLUORIDE-CONTAINING DENTIFRICE DISPENSER
Irving A. Ellman, 1624 Sherborne Road,
Valley Stream, N.Y.
Filed Feb. 28, 1963, Ser. No. 261,755
2 Claims. (Cl. 222—94)

This invention relates to dentifrice dispensers, and in particular to a dispenser for dispensing a fluent dentifrice composition capable of furnishing active fluorides to the teeth for their known prophylactic function of protecting the teeth against caries.

It has been amply demonstrated that the application to the teeth of aqueous solutions of fluorides inhibits tooth decay, and this practice is a preventive measure which is generally recognized and widely used by the dental profession. The addition of fluorides to drinking water or their topical application by the dentist himself has proven quite satisfactory. However, the addition of the fluoride directly to a dentrifice has not been fully satisfactory. The chief reason is that the usual dentifrice contains an abrasive agent for cleaning and polishing the teeth in the form of a calcium salt, such as calcium carbonate or calcium phosphate, and the calcium ions have a very strong affinity for fluorine ions and readily combine with the latter to form essentially insoluble calcium fluoride. Thus the fluorine ions become preliminarily bound in an insoluble form before the desirable reaction with the tooth enamel can progress. This fact has made dentifrices containing sodium fluoride unsatisfactory.

An advance was made through the use of stannous fluoride, which is slightly less soluble than the sodium fluoride, and thus it was hoped to minimize or retard the reaction of the free fluoride ions with the calcium salt abrasive. Another approach was to treat the calcium salt to render it less soluble and hence less reactive with fluorine. However, neither one of these suggestions, nor both of them together, has proven wholly satisfactory. In both cases, only a minor degree of improvement is achieved, because the fact remains that the fluoride, in finely divided form, is intimately mixed with the calcium salt, also in finely divided form, within the dentifrice container for prolonged periods of time and major reaction between them is unavoidable.

A further approach was to increase the fluoride content within the dentifrice to provide an amount of free fluoride in excess of that required to combine fully with the calcium salt. However, the disadvantage of this approach is the excessive quantity of fluoride made available, and the possibility that the imbibing of excessive quantities of calcium-fluorine compounds might cause undesirable reaction with stomach acids and the possible liberation of free fluorine which may cause undue toxic effects.

In order to render fluorides more effective in a dentifrice for decay prevention despite the inherent affinity of the fluorine ions for calcium ions, in accordance with my invention, I isolate the abrasive agent containing the calcium constituent from the decay-preventing agent containing the fluoride within the dentifrice. Specifically, I provide or make available in the dentifrice dispenser mechanically separated compartments for housing the abrasive and the fluoride constituents separately. Hence, while in the dentifrice, all undesirable reactions between the two are prevented. My novel dentifrice dispenser provides for simultaneous extrusion and mixing of the two components only at the time of actual use, thus minimizing the time during which the components may react. An important feature of the invention is that minimal quantities of fluorides may thus be employed to attain the maximum decay-preventive action thereby avoiding any possible detrimental toxic effect attending excess quantities of free fluorine.

In a preferred form of my invention, I provide the fluoride component in a separate collapsible insert tube mounted within, or arranged to be mounted within, a conventional collapsible tube dispenser containing a conventional dentifrice composition free of the fluoride, with the insert tube nozzle arranged within but radially spaced from the outer tube nozzle. Pressure exerted on the outer tube causes the extrusion of a small amount of the dentifrice composition, and simultaneously the pressure is transferred to the inner tube causing a simultaneous extrusion of the fluoride component within the dentifrice composition, whereby a fluoridated composition is made available for the user only at the time of use.

Further objects and advantages of my invention will be apparent from the following detailed description of several exemplary embodiments thereof taken in conjunction with the accompanying drawing, in which:

FIG. 1 is a longitudinal cross-sectional view of one form of dispenser in accordance with my invention;

FIG. 2 is a top view of the nozzle end of the dispenser of FIG. 1;

FIG. 3 is a perspective view of an insert tube for use in the dispenser of FIG. 1;

FIG. 4 is a longitudinal cross-sectional view of a preferred modification of my invention;

FIG. 5 is a cross-sectional view along the line 5—5 of the FIG. 4 modification;

FIG. 6 is a cross-sectional view of the bottom end of the dispenser of FIG. 1 prior to filling;

FIG. 7 illustrates how the filled tube of FIG. 6 may be sealed;

FIG. 8 is a top view of the nozzle end of the FIG. 4 modification.

FIG. 1 is a longitudinal cross-sectional view of a preferred embodiment of my invention. It comprises a conventional collapsible tube 1 of the type commonly used for fluent or paste-like materials, e.g., toothpaste, made, for example, of aluminum, tin, lead or like metals, or of suitable soft and flexible synthetic resins, such as polyvinyl or polyethylene. As illustrated, a threaded nozzle 2 (the usual closing cap is not shown) is provided at the upper end of the hollow tube 1, from which end the tube widens and the walls thin down to form the conventional oval or round collapsible tube portion 3. As is well known, applying pressure to or squeezing the tube 1 causes the paste-like contents to be extruded from the nozzle 2. Within this outer tube 1 is a conventional dentifrice composition 4 containing a suitable abrasive, serving as a cleansing or polishing agent, and the usual surface-active agents, binders, plasticizers, flavoring materials, sweetening agents, coloring materials, lubricants, gums and inert fillers constituting the usual vehicle or base, but free of the water-soluble inorganic fluoride. Any of the ingredients commonly employed in dentifrices are suitable. For example, the abrasive may be chosen from among the alkaline earth metal salts, such as calcium carbonate, calcium ortho-, meta-, or pyrophosphates. Typical surface-active agents are water-soluble alkyl and alkyl ether sulfates and sulfonates. Typical thickening agents are water-soluble salts of cellulose ethers such as sodium carboxymethyl cellulose and sodium carboxymethyl hydroxyethyl cellulose. Generally the abrasive constitutes 20% to 60% by weight of the dentifrice, the surface active agent and the thickener a few percent apiece, a plasticizer or humectant such as glycerine or sorbitol constituting 10%–40%, used alone or diluted with water, and the remainder water.

The pH of the composition is generally maintained between 4.0 and 9.0.

Mounted within the outer tube 1 is an inner insert tube 5. The latter may be constituted of the same materials which constitute the outer tube 1, so that it too is collapsible. The top end is open forming a nozzle 6. To that end is secured by means of, for example, a suitable adhesive, one end of a helically-coiled spring metal strip 7. As will be noted from FIG. 2, the other end of the strip bears against the inner wall of the outer tube nozzle 2 and is held therein by the resilient forces exerted by the spring metal of the strip 7. Thus frictional forces tightly hold the insert tube 5 in place within the outer tube orifice. To further ensure this result, as shown, the lower edge of the strip 7 may be flared to grip the tapered portion of the tube. Only a portion of the nozzle opening 2 is occupied by the insert tube 5 leaving the remainder free for dispensing or ejection of the abrasive mixture. The insert tube 5 extends the full length of the outer tube 1, and contains within it a fluoride composition 8. This includes one or more of the water-soluble fluoride compounds already well known in the art, such as stannous fluoride, sodium fluoride, potassium fluoride and the like. A feature of the invention is that sodium fluoride will be effective in the inventive construction. A suitable vehicle or base for the fluoride is provided by a mixture of the same constituents employed for the abrasive component, excepting, of course, the abrasive constituent or like constituents which react with the fluorine ions binding them up in an inactive or insoluble form. Thus, for example, a suitable composition includes a thickening agent such as carboxymethyl cellulose and water. Natural gums such as gum karaya, gum arabic and gum tragacanth or other inert fillers may be employed. Humectants may be substituted in part for the water. The usual flavorings and sweeteners may also be employed. It will be appreciated that the exact formulations in both compartments are not critical, so long as the abrasive and fluoride components are maintained separate. The amount of the fluoride present may be maintained at minimal levels to avoid undesirable toxic reactions. Thus, in the insert tube 5, the fluoride content may vary between 0.1% and 2% by weight. It should also be borne in mind that paste 8 from the insert tube 5 is extruded simultaneously with paste 4 from the outer tube 1, and the ingredient proportions are chosen so that the combined composition when extruded, including both the abrasive component and the fluoride component, has the desired consistency, cleaning action, flavor, effective cavity preventing action, and pH desired. Thus, for best results, the quantity of fluoride provided should be capable of supplying from about 10 parts to about 1000 parts of fluorine ions per million parts of dentrifice, with the smaller amounts preferred.

A specific example, which is not intended to be limiting, is given below, all in weight percent:

| Outer Tube | Insert Tube |
| --- | --- |
| Abrasive—calcium phosphate—40.<br>Thickening agent—sodium carboxymethyl cellulose—Approximately 1 (to give desired consistency).<br>Humectant—Sorbital, glycerol—20.<br>Flavoring—sweetening, minor<br>water—38. | Fluoride—sodium fluoride—0.4.<br>Thickening agent—sodium carboxymethyl cellulose—Approximately 4 (to give desired consistency).<br>Humectant—36.<br>Water—59.6. |

The embodiment illustrated in FIGS. 1 and 2 contemplates the dentifrice manufacturer supplying the combined outer 1 and inner 5 tubes in a single package for use by the ultimate consumer. By correct proportioning of the ingredients along the lines indicated, it is ensured that when the user squeezes the tube, a small amount of each of the pastes is extruded in proportions sufficient to ensure the desired results. The low fluoride concentration in the insert tube prevents any undue toxic effects. Further, it is also part of my invention for the insert tube alone to be marketed for the user to insert himself into a separately purchased toothpaste tube. This is illustrated in FIG. 3. As will be observed, a similar construction for the insert tube 5 can be provided of a length and diameter adapted to fit within and extend the full length of the ordinary toothpaste tube. A similar spring strip 7' can be employed for mounting and securing the insert tube within the nozzle of the outer tube. The user takes the insert tube 5 and forces it into the toothpaste tube keeping the strip 7' wound, until the latter is located within the nozzle of the outer tube. When the wound strip 7' is released, it will resiliently bear against the nozzle wall firmly locking the insert tube 5 in position. This enables any consumer to convert any non-fluoridated toothpaste into an effective fluoridated version. Mounting means other than the spring strip 7' can also be employed for fixing the insert tube 5 within the outer tube. For instance, a spring steel wire can be wrapped around the upper end of the insert tube in gradually enlarging loops. The smaller loops would grip the insert tube, intermediate sized loops would have a size adapted to hug the inside walls of the outer tube orifice, and the largest loops adapted to engage the widened sections of the outer tube orifice to assist in maintaining the insert tube in position.

FIG. 4 illustrates a modification which offers the advantage of simplifying the manufacture of the combined dispenser. It comprises a conventional outer collapsible tube 11 with the usual threaded nozzle 12. A concentric inner collapsible tube 15 is mounted within the outer tube 11, so that its nozzle end 16 is centrally arranged within the orifice of the outer tube. The mounting means is a four-spoked radially extending spider 17, a top view of which is shown in FIG. 8. FIG. 5 illustrates the oval shapes of both containers. Preferably, within the outer tube 11 is disposed an abrasive-containing paste 14 as described above, and within the inner tube 15 is provided a fluoride-containing paste 18 as described above, though the pastes may be reversed if desired. Preferably the fluoride is incorporated within the paste which is extruded in smaller amounts.

FIG. 6 illustrates a convenient manner for back filling the two pastes. After the inner tube 15 has been mounted in position within the outer tube 11, the bottom ends are flared and into the compartment formed by the outer tube is injected the abrasive component 14. Simultaneously or later, the fluoride component 18 is injected into the compartment formed by the inner tube. Then, as illustrated in FIG. 7, the open ends are brought together and permanently united with the usual crimped fold 19. Thus, the pastes in the two compartments are isolated as required. When the combined dispenser is squeezed, both components are similtaneously extruded for use by the consumer.

It is preferred that the nozzle of the inner tube extends clear to the end of the nozzle of the outer tube as shown so that when the cap is screwed on tight, the constituents are maintained separate from one another preventing any deleterious reaction. This is readily achieved in the embodiment of FIG. 4 by initially providing both tubes of the same length. A further advantage is that the crimping of the open ends together to seal off the bottom automatically unites the tubes, the spider at the nozzle end retaining the nozzles in the desired position. Further, when the tubes are of the same length, it is ensured that pressure applied to the outer tube will be transferred to the inner tube to obtain simultaneous extrusion of both pastes.

While I have described my invention in connection with specific embodiments and applications, other modifications thereof will be readily apparent to those skilled in this art without departing from the spirit and scope of the invention as defined in the appended claims.

What is claimed is:

1. A dentifrice dispenser comprising a first outer, collapsible, tubular, hollow container having an open end, a second inner, collapsible, tubular, hollow container having an open end and of the same length as and within the outer container and entirely separate from the latter, a fluent dentifrice containing a calcium salt abrasive material within said outer container, a fluent material containing a caries-preventing, soluble, alkaline earth metal fluoride within the said inner container and completely isolated by the walls of the second inner container from the said abrasive material, said last-named fluent material containing an effective amount of said fluoride in soluble free-fluorine-ion-producing form, and means for maintaining the open end of said inner container within the open end of said outer container, said maintaining means comprising a wound element of resilient material connected to the inner container and frictionally held within the open end of the outer container, whereby pressure exerted on the outer container causes the simultaneous ejection of fluent material from both containers in the proximity of one another.

2. A fluoride dispenser for insertion within and use with a collapsible tube containing a non-fluoridated dentifrice, comprising an elongated, hollow, collapsible insert tube having an orifice at one end, a fluent material including a water-soluble, alkaline earth metal fluoride and free of constituents reactable with free fluorine to produce an insoluble product within the said insert tube, and means associated with the orifice end of the tube for securing same within the collapsible tube containing the non-fluoridated dentifrice when inserted therein, said last-named means including a helically-wound spring metal element connected at its inner end to the orifice end of the insert tube.

References Cited by the Examiner
UNITED STATES PATENTS

| 1,639,699 | 8/27 | Hopkins | 222—94 |
| 1,699,532 | 1/29 | Hopkins | 222—94 |
| 2,789,731 | 4/57 | Marraffino | 222—94 X |
| 2,830,730 | 4/58 | Saffir | 222—94 X |

FOREIGN PATENTS 4,650  8/51  Japan.

LOUIS J. DEMBO, *Primary Examiner.*